United States Patent
Peng et al.

(10) Patent No.: US 11,557,903 B2
(45) Date of Patent: Jan. 17, 2023

(54) METHOD FOR EQUALIZING BATTERY MODULE, APPARATUS, BATTERY MODULE AND POWER MANAGEMENT CONTROLLER

(71) Applicant: CONTEMPORARY AMPEREX TECHNOLOGY CO., LIMITED, Fujian (CN)

(72) Inventors: Lei Peng, Ningde (CN); Guangyu Xu, Ningde (CN); Shichang Zhang, Ningde (CN); Shichao Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/488,410

(22) Filed: Sep. 29, 2021

(65) Prior Publication Data
US 2022/0209547 A1    Jun. 30, 2022

Related U.S. Application Data

(63) Continuation of application No. PCT/CN2020/141793, filed on Dec. 30, 2020.

(51) Int. Cl.
H02J 7/00       (2006.01)
H01M 10/42     (2006.01)
H01M 50/51     (2021.01)

(52) U.S. Cl.
CPC ......... H02J 7/0016 (2013.01); H01M 10/425 (2013.01); H01M 50/51 (2021.01);
(Continued)

(58) Field of Classification Search
CPC .............. H02J 7/0016; H02J 7/00047; H02J 7/007186; H02J 7/007182
See application file for complete search history.

(56) References Cited

U.S. PATENT DOCUMENTS

| 7,737,660 B2 | 6/2010 | Yun |
| 7,839,116 B2 | 11/2010 | Esaka et al. |

(Continued)

FOREIGN PATENT DOCUMENTS

| CN | 101160688 A | 4/2008 |
| CN | 102938570 A | 2/2013 |

(Continued)

OTHER PUBLICATIONS

International Search Report and Written Opinion dated Oct. 8, 2021 received in International Application No. PCT/CN2020/141793 together with an English language translation.

*Primary Examiner* — David V Henze-Gongola
*Assistant Examiner* — Tarikh Kanem Rankine
(74) *Attorney, Agent, or Firm* — Scully Scott Murphy & Presser

(57) ABSTRACT

This application embodiment provides a method for equalizing the battery module, an apparatus, a battery module and a power management controller, including: judging whether the first battery core and the second battery core enter their respective fully-charged interval; if the first battery core enters and the second battery core doesn't enter, discharging the first battery core until the second battery core enters; if the first battery core doesn't enter and the second battery core enters, judging whether the maximum value of the first charging voltage of each battery cell in the first battery core is greater than a third preset value; if so, discharging the second battery core until the first battery core enters; if not, controlling both to rest a preset time; after resting for the preset time, discharging the first battery core and the second battery core until the SOC of each battery cell enters a same state.

20 Claims, 5 Drawing Sheets

(52) U.S. Cl.
CPC ...... *H02J 7/0049* (2020.01); *H02J 7/007182* (2020.01); *H01M 2010/4271* (2013.01)

(56) References Cited

U.S. PATENT DOCUMENTS

| | | |
|---|---|---|
| 8,098,041 B2 | 1/2012 | Kokotovich et al. |
| 9,365,115 B2 | 6/2016 | Ferrel et al. |
| 9,630,514 B2 | 4/2017 | Ferrel et al. |
| 2008/0048621 A1 | 2/2008 | Yun |
| 2009/0015193 A1 | 1/2009 | Esaka et al. |
| 2009/0115373 A1 | 5/2009 | Kokotovich et al. |
| 2013/0187590 A1 | 7/2013 | Ferrel et al. |
| 2014/0145669 A1 | 5/2014 | Wortham |
| 2015/0200552 A1* | 7/2015 | Nortman ............... G01R 31/382 320/134 |
| 2016/0221457 A1 | 8/2016 | Ferrel et al. |
| 2021/0367278 A1 | 11/2021 | Zhang et al. |
| 2022/0006303 A1 | 1/2022 | Chen et al. |

FOREIGN PATENT DOCUMENTS

| | | | |
|---|---|---|---|
| CN | 103213510 A | 7/2013 | |
| CN | 108988421 A | 12/2018 | |
| EP | 1892813 A2 | 2/2008 | |
| EP | 2055523 A3 | 3/2012 | |
| JP | 2021027031 A * | 2/2021 | ........... G01R 31/392 |
| KR | 101500547 B1 * | 3/2015 | .......... H01M 10/482 |
| WO | 2020191541 A1 | 10/2020 | |
| WO | 2020191550 A1 | 10/2020 | |

\* cited by examiner

METHOD FOR EQUALIZING BATTERY MODULE, APPARATUS, BATTERY MODULE AND POWER MANAGEMENT CONTROLLER

CROSS-REFERENCE TO RELATED APPLICATIONS

This application is a continuation of International Application No. PCT/CN2020/141793, filed on Dec. 30, 2020, the disclosure of which is hereby incorporated by reference in its entirety.

TECHNICAL FIELD

This present application relates to the technical field of battery equalization, and in particular, to a method and apparatus for equalizing the battery module, a battery module, and a power management controller.

BACKGROUND

Battery equalization refers to the use of power electronics technology to keep lithium-ion battery cell voltage or the voltage deviation of battery module within the expected range, so as to ensure that each single battery in the battery module maintains the same state during use in order to avoid the occurrence of overcharge/overdischarge, and further to improve the life of the battery module.

Existing battery equalization methods are generally based on voltage for charge and discharge equalization, but such equalization methods are only suitable for a single type of battery core. A single type of battery cell means that each single battery in the battery module belongs to the same type (such as it is a ternary battery core or an iron-lithium battery core), and for a battery module with two kinds of battery cores (such as with both an iron-lithium battery core and a ternary battery core at the same time). Due to the different characteristics of different kinds of battery cores, their fully-charged voltages are also different, so the battery equalization method based on a single type of battery core has poor accuracy for equalizing a battery module with two kinds of battery cores.

SUMMARY

The purpose of the embodiment of the present application is to provide a method for equalizing, apparatus, a battery module, and a power management controller, so as to solve the problem of poor accuracy in equalizing battery modules with two kinds of battery cores.

In a first aspect, the application provides a method for equalizing a battery module, the battery module including a first battery core, a second battery core and a power management controller, the first battery core and the second battery core being connected in series, both the first battery core and the second battery core including at least one battery cell, the first battery core including a first battery chemical component and exhibiting a first open circuit potential curve, the second battery core including a second battery chemical component and exhibiting a second open potential curve, and the first open circuit potential curve being different from the second open circuit potential curve, the method including : obtaining, by the power management controller, a first charging voltage of each battery cell in the first battery core and a second charging voltage of each battery cell in the second battery core; judging, by the power management controller, whether a maximum value of the first charging voltage of each battery cell in the first battery core is greater than a first preset value to determine whether the first battery core enters a corresponding first fully-charged interval; judging, by the power management controller, whether a maximum value of the second charging voltage of each battery cell in the second battery core is greater than a second preset value to determine whether the second battery core enters a corresponding second fully-charged interval; if the first battery core enters its corresponding first fully-charged interval and the second battery core doesn't enter its corresponding second fully-charged interval, discharging the first battery core by the power management controller until the second battery core enters its corresponding second fully-charged interval; if the first battery core doesn't enter its corresponding first fully-charged interval and the second battery core enters its corresponding second fully-charged interval, obtaining the maximum value of the first charging voltage, judging whether the maximum value of the first charging voltage of each battery cell in the first battery core is greater than a third preset value by the power management controller; and if so, discharging the second battery core by the power management controller until the first battery core enters its corresponding first fully-charged interval; if not, controlling the first battery core and the second battery core to rest for a preset time by the power management controller; after resting for the preset time, discharging the first battery core and the second battery core by the power management controller until a SOC of each battery cell in the first battery core and the second battery core enters a same state.

In the above-designed method for equalizing, firstly obtaining a first charging voltage of each battery cell in the first battery core and a second charging voltage of each battery cell in the second battery core, and then judging whether a maximum value of the first charging voltage of each battery cell in the first battery core is greater than a first preset value to determine whether the first battery core enters a corresponding first fully-charged interval, and judging whether a maximum value of the second charging voltage of each battery cell in the second battery core is greater than a second preset value to determine whether the second battery core enters its corresponding second fully-charged interval. When the first battery core enters its corresponding first fully-charged interval and the second battery core doesn't enter its corresponding second fully-charged interval, discharging the first battery core until the second battery core enters its corresponding second fully-charged interval. So as to solve the equalizing problem of the first battery core and the second battery core when the first battery core enters its corresponding first fully-charged interval and the second battery core doesn't enter its corresponding second fully-charged interval. When the first battery core doesn't enter its corresponding first fully-charged interval and the second battery core enters its corresponding second fully-charged interval, judging whether the maximum value of the first charging voltage of each battery cell in the first battery core is greater than a third preset value. And if so, discharging the second battery core until the first battery core enters its corresponding first fully-charged interval; if not, controlling the first battery core and the second battery core to rest for a preset time.

After resting for the preset time, discharging the first battery core and the second battery core by the power management controller, until a SOC of each battery cell in the first battery core and the second battery core enters the same state, so as to solve the equalizing problem when the first battery core doesn't enter its corresponding first fully-charged interval and the second battery core enters its corresponding second fully-charged interval, realizing the equalization method of two different kinds of battery cores in the battery module, and solving the problem that the equalization of battery modules with two different kinds of battery cores is not accurate when using the existing voltage based charge and discharge equalization, and improving the accuracy of the equalization of battery modules with two different kinds of battery cores.

In an optional implementation manner of the first aspect, discharging the first battery core until the second battery core enters its corresponding fully-charged interval, includes: determining at least one target battery cell according to the first charging voltage of each battery cell in the first battery core; discharging the at least one target battery cell until the second battery core enters its corresponding second fully-charged interval.

In an optional implementation manner of the first aspect, determining at least one target battery cell according to the first charging voltage of each battery cell in the first battery core, includes: calculating a difference between a fully-charged voltage of the second battery core and a minimum value of the second charging voltage in the second battery core to obtain a voltage difference value; determining a fourth preset value according to a fully-charged voltage of the first battery core and the voltage difference value; determining a battery cell with a first charging voltage in the first battery core is greater than the fourth preset value as a target battery cell to obtain the at least one target battery cell.

In an optional implementation manner of the first aspect, discharging the at least one target battery cell by the power management controller until the second battery core enters its corresponding second fully-charged interval, includes: discharging the at least one target battery cell; judging whether a maximum value of the second charging voltage in the battery cell is greater than the second preset value, during discharging of the at least one target battery cell; if so, stopping discharging the at least one target battery cell by the power management controller.

In an optional implementation manner of the first aspect, after resting for the preset time, discharging the first battery core and the second battery core until a SOC of each battery cell in the first battery core and the second battery core entering a same state, includes: obtaining a SOC value of each battery cell in the first battery core after resting the preset time; discharging a battery cell other than the battery cell corresponding to a minimum SOC value in the first battery core, so that the SOC value of each battery cell in the first battery core is equal to the minimum SOC value; determining a discharge capacity according to the minimum SOC value; discharging each battery cell in the second battery core according to the discharge capacity.

In an optional implementation manner of the first aspect, determining a discharge capacity according to the minimum SOC value by the power management controller, includes: obtaining a rated capacity of the second battery core; calculating the discharge capacity according to the minimum SOC value and the rated capacity of the second battery core.

In a second aspect, the application provides an equalizing apparatus of a battery module, the battery module including a first battery core, a second battery core and a power management controller, the first battery core and the second battery core being connected in series, both the first battery core and the second battery core including at least one battery cell and the first battery core including a first battery chemical component and exhibiting a first open circuit potential curve, the second battery core including a second battery chemical component and exhibiting a second open potential curve, and the first open circuit potential curve being different from the second open circuit potential curve, the apparatus including: an obtaining module, configured to obtain a first charging voltage of each battery cell in the first battery core and a second charging voltage of each battery cell in the second battery core; a judgment module, configured to judge whether a maximum value of the first charging voltage of each battery cell in the first battery core is greater than a first preset value to determine whether the first battery core enters its corresponding first fully-charged interval; the judgment module further configured to judge whether a maximum value of the second charging voltage of each battery cell in the second battery core is greater than a second preset value to determine whether the second battery core enters its corresponding second fully-charged interval; a discharge module, configured to discharge the first battery core until the second battery core enters its corresponding second fully-charged interval after the judgment module judges that the first battery core enters its corresponding first fully-charged interval and the second battery core doesn't enter its corresponding second fully-charged interval; the obtaining module, further configured to obtain the maximum value of the first charging voltage after the judgment module judges that the first battery core doesn't enter its corresponding first fully-charged interval and the second battery core enters its corresponding second fully-charged interval; the judgment module, further configured to judge whether the maximum value of the first charging voltage of each battery cell in the first battery core is greater than a third preset value; the discharge module configured to discharge the second battery core until the first battery core enters its corresponding first fully-charged interval after the judgment module judges that the maximum value of the first charging voltage of each battery cell in the first battery core is greater than a third preset value; a resting module, configured to control the first battery core and the second battery core to rest for a preset time after the judgment module judges that a maximum first charging voltage is less than the third preset value; the discharge module further configured to discharge the first battery core and the second battery core until a SOC of each battery cell in the first battery core and the second battery core enters the same state after resting for the preset time.

In the above-designed the equalizing apparatus, firstly obtaining a first charging voltage of each battery cell in the first battery core and a second charging voltage of each battery cell in the second battery core, and then judging whether a maximum value of the first charging voltage of each battery cell in the first battery core is greater than a first preset value to determine whether the first battery core enters its corresponding first fully-charged interval, and judging whether a maximum value of the second charging voltage of each battery cell in the second battery core is greater than a second preset value to determine whether the second battery core enters its corresponding second fully-charged interval. When the first battery core enters its corresponding first fully-charged interval and the second battery core doesn't enter its corresponding second fully-charged interval, discharging the first battery core until the second battery core enters its corresponding second fully-charged interval. So as to solve the equalizing problem of the first battery core and the second battery when the first battery core enters its corresponding first fully-charged interval and the second battery core doesn't enter its corresponding second fully-charged interval. When the first battery core doesn't enter its corresponding first fully-charged interval and the second battery core enters its corresponding second fully-charged interval, judging whether the maximum value of the first charging voltage of each battery cell in the first battery core is greater than a third preset value. And if so, discharging the second battery core until the first battery core enters its corresponding first fully-charged interval; if not, controlling the first battery core and the second battery core to rest for a preset time. After resting for the preset time, discharging the first battery core and the second battery core by the power management controller, so as to solve the equalizing problem when the first battery core doesn't enter its corresponding first fully-charged interval and the second battery core enters its corresponding second fully-charged interval, realizing the equalization method of two different kinds of battery cores in the battery module, and solving the problem that the equalization of battery modules with two different kinds of battery cores is not accurate when using the existing voltage based charge and discharge equalization, and improving the accuracy of the equalization of battery modules with two different kinds of battery cores.

In a third aspect, the application provides a battery module, the battery module including: a first battery core and a second battery core, the first battery core and the second battery core being connected in series, both the first battery core and the second battery core including at least one battery cell, the first battery core including a first battery chemical component and exhibiting a first open circuit potential curve, the second battery core including a second battery chemical component and exhibiting a second open circuit potential curve, and the first open circuit potential curve being different from the second open circuit potential curve; a power management controller, configured to execute the method for equalizing according to an optional implementation manner of the first aspect to perform equalization processing on the first battery core and the second battery core.

In an optional implementation manner of the third aspect, the battery module further includes: a plurality of equalization units, each the equalization units being disposed on one battery cell, the power management controller and each equalization units being electrically connected to control the equalization unit to perform equalization processing on the corresponding battery cell.

In a fourth aspect, the application provides a power management controller, the power management controller including a chip, an instruction is solidified in the chip, the instruction, when executed by the chip, executes the method for equalizing according to the first aspect and any one of an optional implementation manner of the first aspect.

In a fifth aspect, the present application provides a storage medium with a computer-executable instruction stored therein, the computer-executable instruction executes the method in the first aspect, any one of an optional implementation manner of the first aspect, when executed by the processor.

In a sixth aspect, the present application provides a computer program product, the computer program product, when executed by a computer, causes the computer to execute the method in the first aspect, in any one of an optional implementations of the first aspect.

BRIEF DESCRIPTION OF THE DRAWINGS

In order to illustrate the technical solutions in embodiments of the present application more clearly, brief description will be made below to drawings required in the embodiments of the present application, and apparently, the drawings described below are some embodiments of the present application only, and other drawings could be obtained based on these drawings by those ordinary skilled in this art without creative efforts.

Figure 1:
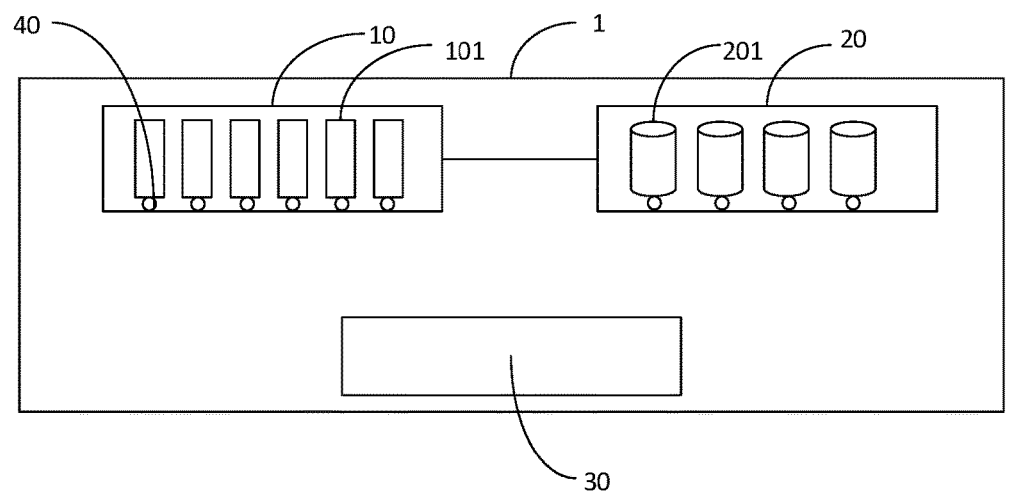
FIG. 1 is a schematic structural diagram of a battery module provided by an embodiment of the application.

In the drawings, the drawings are not drawn to actual scale.

Description of reference signs: 1—battery module; 10—first battery core; 101—first battery cell; 20—second battery core; 201—second battery cell; 30—power management controller; 40—equalization unit; 800—obtaining module; 801—judgment module; 802—discharge module; 803—resting module; 9—chip; 901—processor; 902—memory; 903—communication bus.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise provided, "a plurality of" means more than two; and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus may not be understood as limitation to the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The orientation words appearing in the following description are all directions shown in the drawings, and do not limit the specific structure of the present application. In the description of the present application, it should be further noted that, unless explicitly specified and defined otherwise, terms "installation", "interconnection", and "connection"

should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

FIG. 1 shows an example of a battery module 1 according to the present application, the battery module 1 includes a first battery core 10, a second battery core 20, and a power management controller 30, the first battery core 10 and the second battery core 20 are connected in series, the first battery core 10 includes at least one first battery cell 101 and the second battery core 20 includes at least one second battery cell 201. The first battery core has a first battery chemical component and exhibits a first open circuit potential curve, and the second battery core has a second battery chemical component and exhibits a second open potential curve. The first open circuit potential curve is different from the second open circuit potential curve.

Figure 2:
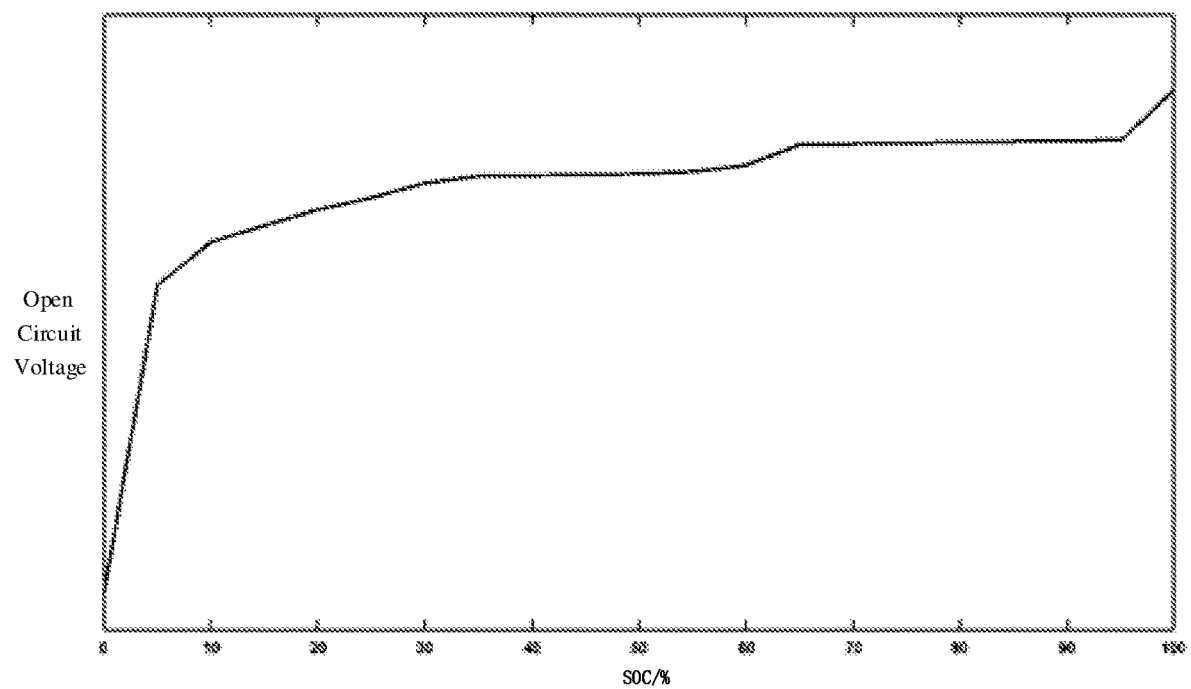
FIG. 2 is a schematic diagram of an open circuit potential curve of a first battery core provided by an embodiment of the application.
Figure 3:
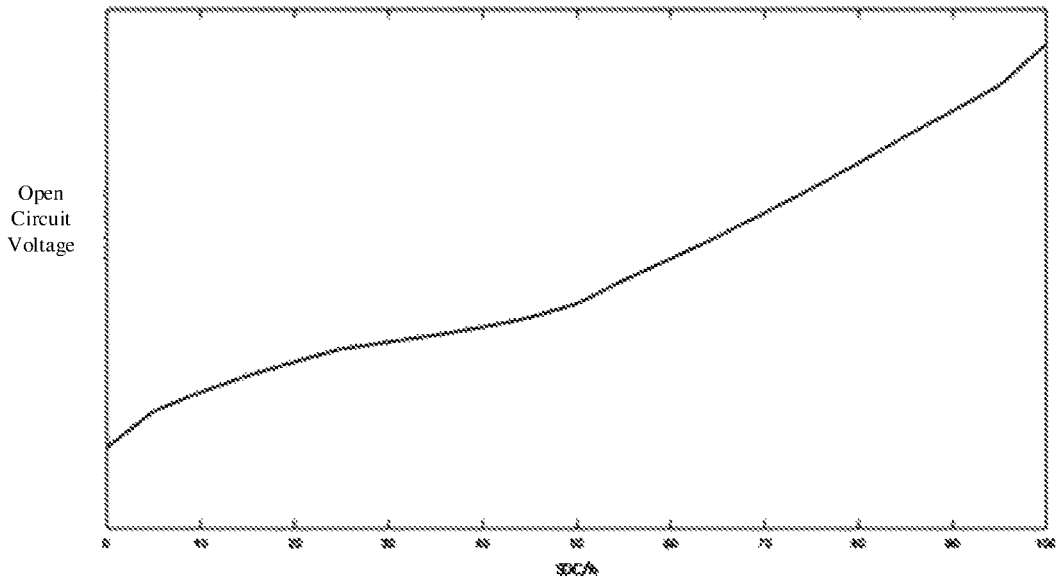
FIG. 3 is a schematic diagram of an open circuit potential curve of a second battery core provided by an embodiment of the application.

The difference in open circuit potential curve of different kinds of battery cores will be described below. It is assumed that the first battery core 10 is an iron-lithium battery core, the second battery core 20 is a ternary battery core. The open circuit potential curve of the iron-lithium battery core is shown in FIG. 2. The open circuit potential curve of the ternary battery core is shown in FIG. 3. Compared with FIG. 2 and FIG. 3, it can be seen that the slope of the open circuit potential curve of the iron-lithium battery core is greater than the slope of the open circuit potential curve of the ternary battery core under the state of charge of 0% to 8%, but the slope of the open circuit potential curve of the iron-lithium battery core is less than that of the ternary battery core under the state of charge of about 8% to 95%. The open circuit potential curve of the iron-lithium core shows a trend of steep rise and then smooth rise, the open circuit potential curve of the ternary core shows a trend of gradual rise.

The power management controller 30 can collect the state parameters of each first battery cell 101 in the first battery core 10 and each second battery cell 201 in the second battery core 20, such as charging voltage, open circuit voltage, etc. As a possible implementation, the power management controller 30 can be directly connected to each battery cell via a wire or cable and collect the state parameters of each battery cell. As another possible implementation, the power management controller may not be directly connected to each battery cell, but rather collect the state parameters of each battery cell via wireless transmission technology.

In some possible implementations, the battery module 1 can also include more components. For example, it can also include a plurality of equalization units 40, each the equalization units 40 is disposed on one battery cell, and the power management controller 30 and each equalization unit 40 are electrically connected to control the equalization unit to perform equalization processing on the corresponding battery cell, where the equalization unit 40 can be a loss circuit, which can be used to lose the power of the connected battery cell under the control of the power management controller 30.

Figure 4:
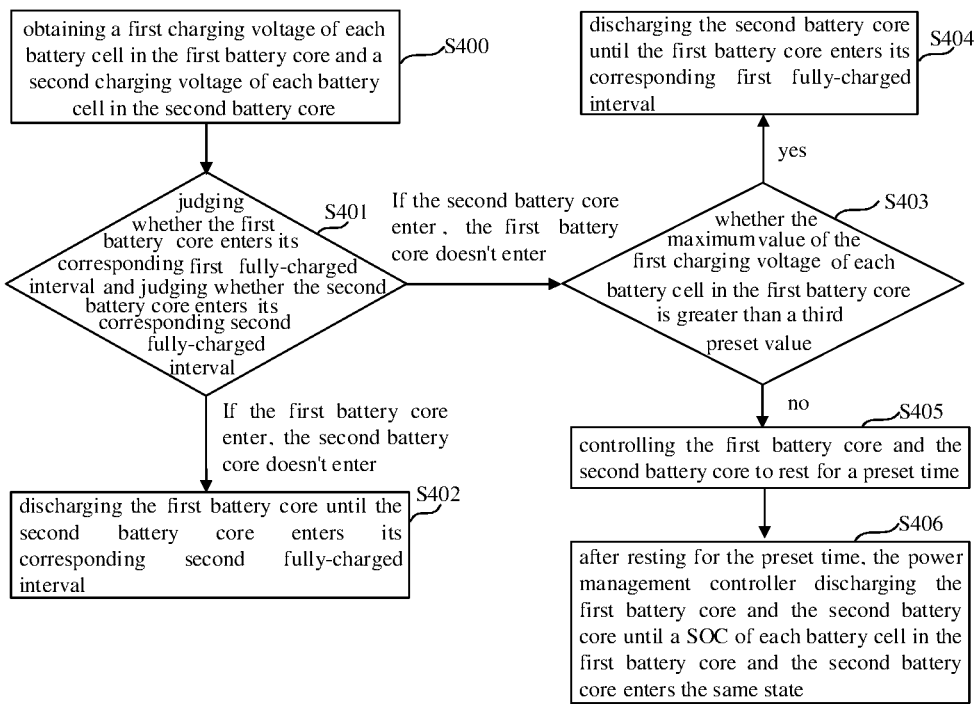
FIG. 4 is a first flowchart of a method for equalizing provided by an embodiment of the application.

Combined with the battery module 1 as shown in FIG. 1, the application scheme provides a method for equalizing a battery module, which is used to equalize the aforementioned battery modules with different kinds of battery cores. The execution subject of this method can be the power management controller in the battery module. As shown in FIG. 4, the method includes the following steps:

Step S400: obtaining a first charging voltage of each battery cell in the first battery core and a second charging voltage of each battery cell in the second battery core.

Step S401: judging whether the first battery core enters its corresponding first fully-charged interval and judging whether the second battery core enters its corresponding second fully-charged interval; if the first battery core enters its corresponding first fully-charged interval and the second battery core doesn't enter its corresponding second fully-charged interval, then proceeds to Step S402; if the first battery core doesn't enter its corresponding first fully-charged interval and the second battery core enters its corresponding second fully-charged interval, then proceeds to Step S403.

Step S402: discharging the first battery core until the second battery core enters its corresponding second fully-charged interval.

Step S403: judging whether the maximum value of the first charging voltage of each battery cell in the first battery core is greater than a third preset value; if so, proceeds to Step S404; if not, proceeds to step S405.

Step S404: discharging the second battery core until the first battery core enters its corresponding first fully-charged interval;

Step S405: controlling the first battery core and the second battery core to rest for a preset time, and then proceeds to Step S406.

Step S406: after resting for the preset time, the power management controller discharging the first battery core and the second battery core until a SOC of each battery cell in the first battery core and the second battery core enters the same state.

The implementation of the above steps will be described in detail below.

In step S400, with reference to the description of the power management controller in FIG. 1, the power management controller can obtain a first charging voltage of each battery cell in the first battery core and a second charging voltage of each battery cell in the second battery core during charging. Furthermore, the power management controller can obtain the maximum and minimum value of the first charging voltage in the first battery core, and the maximum and minimum value of the second charging voltage in the second battery core.

In step S401, the first preset value can be determined according to the fully-charged voltage of the first battery core minus the first set value, and the second preset value can be determined according to fully-charged voltage of the second battery core minus the second set value, thus it can determine whether the first battery core enters its corresponding first fully-charged interval according to whether the maximum value of the first charging voltage in the first battery core is greater than the first preset value. When the maximum value of the first charging voltage is greater than the first preset value, it indicates that the first battery core is close to the state of fully-charged and enters the corresponding first fully-charged interval. When the maximum value of the first charging voltage is less than the first preset value, it indicates that the first battery core isn't still close to the state of fully-charged and doesn't enter the corresponding first fully-charged interval. Similarly, whether the second battery core enters its corresponding second fully-charged interval can be determined according to whether the maximum value of the second charging voltage in the second battery core is greater than the second preset value.

It should be noted that since the first battery core and the second battery core are different kinds of battery core s, the scopes of their fully-charged range interval are also different. Therefore, the first preset value and the second preset value in an embodiment of the application can be designed as different. Of course, it doesn't exclude some special circumstances where the fully-charged voltage of the first battery core minus the first set value is just the same as the fully-charged voltage of the second battery core minus the second set value. Such special circumstances are also within the scope of protection of this application.

In step S402, the first battery core has entered its corresponding first fully-charged interval, indicating that the first battery core has nearly reached fully charged, and at this time, the second battery core has not yet entered its corresponding second fully-charged interval indicating that the second battery core still has not reached a state of fully-charged. At this time, the first battery core is discharged so that the power capacity charged in the first battery core is consumed under a certain extent, and then it slows down the charging speed of the first battery core until the second battery core enters its corresponding second fully-charged interval, and stops discharging consumption on the first battery core and the equalization comes to an end. When the equalization comes to an end, since the first battery core and the second battery core have entered their respective fully-charged interval to be close the state of fully-charged. Thus, when one battery core is fully charged, the other battery cell is also close to or has been fully charged, so as to achieve the equalization between the first battery core and the second battery core.

Figure 5:
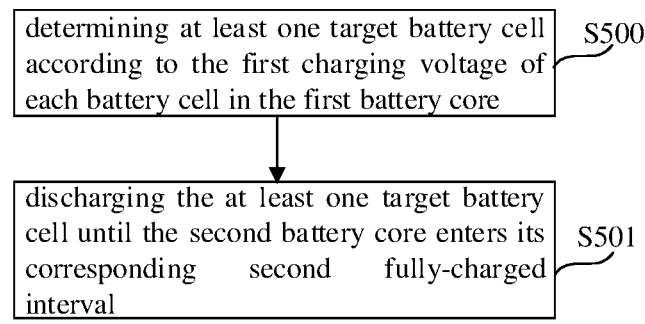
FIG. 5 is a second flowchart of the method for equalizing provided by an embodiment of the application.

As a possible embodiment, the first battery core is discharged in step S402 until the second battery core enters its corresponding second fully-charged interval, and it can be implemented as follows, as shown in FIG. 5, including:

Step S500: determining at least one target battery cell according to the first charging voltage of each battery cell in the first battery core.

Step S501: discharging the at least one target battery cell until the second battery core enters its corresponding second fully-charged interval.

In the above solution, partial battery cells are selected in a plurality of battery cells in the first battery core to perform discharging, and realizes the first battery core is discharged. It should be understood that the target battery cell is discharged in step S501 means charging of the target battery cell while and the discharge consumption is performed, for example, loss circuit is used to consume the charge of the target battery cell and so on.

Figure 6:
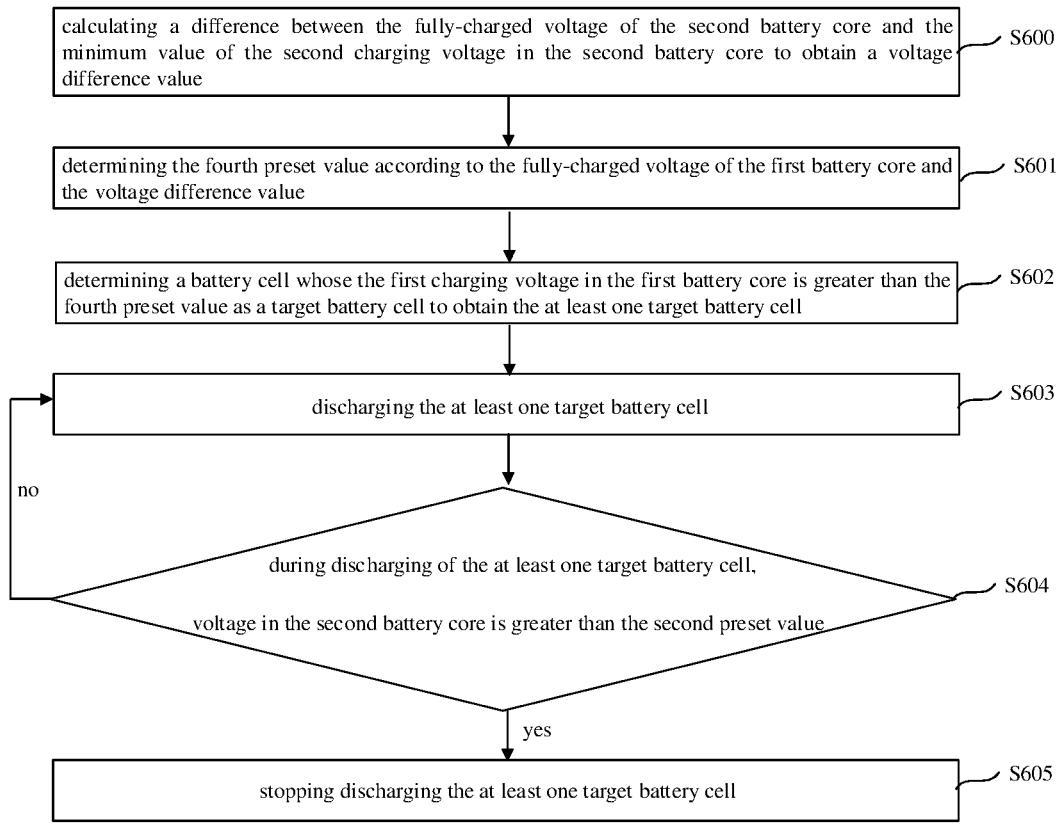
FIG. 6 is a third flowchart of the method for equalizing provided by an embodiment of the application.

There are a variety of ways to determine the target cell in step S00, for example, it can be randomly selected according to the preset number. The following method will be introduced to select target battery cell based on the charging voltage of a plurality of battery cells in the first battery core. As shown in FIG. 6, the method includes the following steps:

Step S600: calculating a difference between the fully-charged voltage of the second battery core and the minimum value of the second charging voltage in the second battery core to obtain a voltage difference value.

Step S601: determining the fourth preset value according to the fully-charged voltage of the first battery core and the voltage difference value.

Step S602: determining a battery cell whose the first charging voltage in the first battery core is greater than the fourth preset value as a target battery cell to obtain the at least one target battery cell.

In the above solution, the first charging voltage is greater than the fourth preset value indicates that the charging voltage of the corresponding battery cell is higher than the rest of battery cells, in order to make different battery cells in the first battery core voltage tends to be consistent, and therefore, select the battery cell whose the first charging voltage is greater than the fourth preset value to discharge.

The following introduces a method for determining the fourth preset value according to a fully-charged voltage and the voltage difference value, which is expressed as the following formula:

$$C = A - (a \times B + b);$$

Where C is the fourth preset value, A is the full-charged voltage pressure of the first battery core, B is the voltage difference value, and a and b are constants.

As a possible implementation manner, as shown in FIG. 6, Step S501 can include the following steps:

Step S603: discharging the at least one target battery cell.

Step S604: during discharging of the at least one target battery cell, the power management controller judging whether a maximum value of the second charging voltage in the second battery core is greater than the second preset value; if so, proceeds to Step S605; if not, proceeds to Step S603.

Step S605: stopping discharging the at least one target battery cell.

In the above solution, during discharging process of the target battery cell, it is possible to judge whether the maximum value of the second charging voltage in the second battery core is greater than the second preset value in accordance with a certain time interval, that is, judge whether the second battery core enters its corresponding second fully-charged interval, if the second battery core doesn't enter its corresponding second fully-charged interval, then continue discharging the target battery cell; if the second battery core enters its corresponding second fully-charged interval, then stop discharging the target battery cell. The present embodiment can find that the battery module enters an equalization state in time, and stop discharging the battery cell to save electric energy.

The solution that the first battery core enters its corresponding first fully-charged interval and the second battery core doesn't enter its corresponding first fully-charged interval is described above. The following continues to introduce the solution when the first battery core doesn't enter its corresponding first fully-charged interval while the second battery core enters its corresponding first fully-charged interval, which is included in steps S403 to S406.

In step S403, the third preset value is determined by the fully-charged voltage of the first battery core and the third set value. The third preset value is smaller than the first preset value, and thus when the maximum value of the first charging voltage in the first battery core is less than the third preset value, it indicates that there has a not small voltage difference from which the first battery core enters the fully-charged interval; when the maximum value of the first charging voltage in the first battery core is greater than the third preset value, it indicates that there has a small voltage difference from which the first battery core enters the fully-charged interval;

When a smaller voltage difference from which the first battery core enters the fully-charged interval is determined by step S403, proceeds to step S404, and the second battery core is discharged until the first battery core enters its corresponding first fully-charged interval. The process of discharging the first battery core can be referred to step S402, and details are not described again.

When a larger voltage difference from which the first battery core enters the fully-charged interval is determined by step S403, if step S404 is still performed to discharge the second battery core, and then the second battery core need a longer time to discharge, which is not unfriendly to charge the second battery core and the overall charging time of the battery module is also longer. In response to this situation, the application provides the following battery method for equalizing.

Firstly, step S405 is performed to rest the first battery core and the second battery core, and stop charging the first battery core and the second battery core during the period of resting. Its purpose is to obtain the open circuit voltage of each battery cell in the first battery core or the second battery core under the state of resting, and then find the SOC corresponding to each battery cell in the open circuit potential curve corresponding to the battery cell based on the open circuit voltage, where SOC refers to the state of charge of a battery cell, which can be found through the open circuit voltage and open circuit potential curve. For example, the open circuit voltage (ordinate) of some battery cell and the open circuit potential curve are obtained in FIG. 2. Then the corresponding SOC (abscissa) of the open circuit voltage can be obtained. The resting time can be set according to experience, or, the resting time can also be set according to parameters such as the temperature of the first core and the second battery core, voltage of the battery core.

Then, step S406 is performed to discharge both the first battery core and the second battery core after resting until the SOC of each battery cell in the first battery core and the second battery core enters the same state, and realizes the equalization between the first battery core and the second battery core, where the SOC of each battery cell in the first battery core and the second battery core enters the same state, means that the SOC in the first battery core and the second battery core are the same or although the difference exists but the difference is within a preset range, and the preset range can be set to a smaller range, for example, the preset range is that the SOC difference between the first battery core and the second battery core is within 10%.

Figure 7:
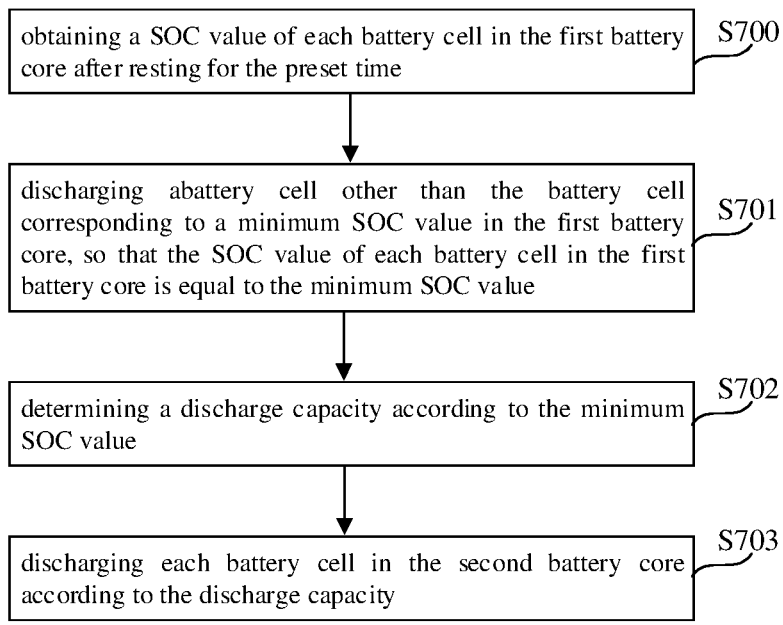
FIG. 7 is a fourth flowchart of the method for equalizing provided by an embodiment of the application.

As a possible embodiment, as shown in FIG. 7, step S406 may include the following steps:

Step S700: obtaining a SOC value of each battery cell in the first battery core after resting for the preset time.

Step S701: discharging a battery cell other than the battery cell corresponding to a minimum SOC value in the first battery core, so that the SOC value of each battery cell in the first battery core is equal to the minimum SOC value.

Step S702: determining a discharge capacity according to the minimum SOC value.

Step S703: discharging each battery cell in the second battery core according to the discharge capacity.

In step S700, since the first battery core and the second battery core have stopped being charged, the SOC value of each battery cell in the first battery core can be calculated according to the open circuit voltage of each battery cell in the first battery core and the first open circuit potential curve of the first battery core, and then the minimum SOC value among the SOC values of each battery cell in the first battery core.

In step S701, each battery cell other than the battery cell corresponding to a minimum SOC value in the first battery core are discharged until the SOC of these battery cores drops to the minimum SOC value, and realize the alignment of each battery core in the first battery core.

In step S702, the discharge capacity is determined according to the minimum SOC value in the first battery core and the discharge capacity, and it is used to discharge capacity each battery core in the second battery core. In a possible implementation manner, the discharge capacity can be calculated according to the minimum SOC value of the first battery core and the rated capacity of the second battery core. For example, the discharge capacity can be calculated by the following formula, which is: discharge capacity=(1−Minimum SOC value)*rated capacity of the second battery core.

In the above solution, the discharge capacity of the second battery core that needs to be discharged can be obtained through the minimum SOC value of the first battery core so that the SOC of the second battery core is close to the minimum SOC of the first battery core after the second battery core is discharged based on the discharge capacity. Finally, the first battery core and the second battery core are under more equalized state.

In the above-mentioned embodiment provided by this application, for the battery module with two different kinds of battery cores, according to the difference between the two battery cores entering the fully-charged interval, different equalization strategies are used to improve equalizing accuracy of the two different kinds of battery cores in the battery module in order to avoid the occurrence of overcharge/overdischarge, and further to improve the life of the battery module.

Figure 8:
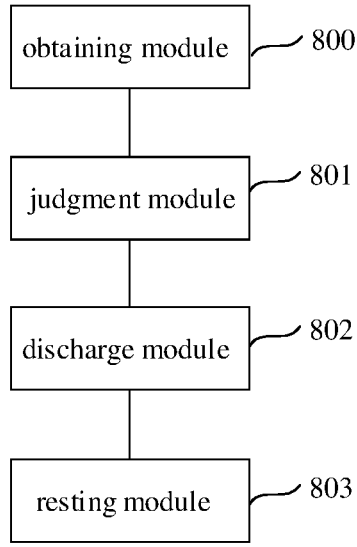
FIG. 8 is a schematic structural diagram of an equalizing apparatus provided by an embodiment of the application.

FIG. 8 shows a schematic structural diagram of an equalizing apparatus of a battery module provided by an embodiment of the application. It should be understood that the apparatus corresponds to the method embodiment executed by the power management controller in FIG. 4 to FIG. 7 and can execute the steps involved in the method executed by the power management controller in the above embodiment. The apparatus includes at least one software function module, the at least one software function module can be stored in a memory in the form of software or firmware, or can be solidified in an operating system (OS) of the apparatus. The apparatus includes: an obtaining module 800, configured to obtain a first charging voltage of each battery cell in the first battery core and a second charging voltage of each battery cell in the second battery core; a judgment module 801, configured to judge whether a maximum value of the first charging voltage of each battery cell in the first battery core is greater than a first preset value to determine whether the first battery core enters its corresponding first fully-charged interval, and judge whether a maximum value of the second charging voltage of each battery cell in the second battery core is greater than a second preset value to determine whether the second battery core enters its corresponding second fully-charged interval; a discharge module 802, configured to discharge the first battery core until the second battery core enters its corresponding second fully-charged interval after the judgment module 801 judges that the first battery core enters its corresponding first fully-charged interval and the second battery core doesn't enter its corresponding second fully-charged interval; the obtaining module 800, is configured to obtain a maximum value of the first charging voltage after the judgment module 801 judges that the first battery core doesn't enter its corresponding first fully-charged interval and the second battery core enters its corresponding second fully-charged interval; the judgment module 801, further configured to judge whether the maximum value of the first charging voltage of each battery cell in the first battery core is greater than a third preset value; the discharge module 802, is configured to discharge the second battery core until the first battery core enters its corresponding first fully-charged interval after the judgment module 801 judges that the maximum value of the first charging voltage of each battery cell in the first battery core is greater than a third preset value; a resting module 803, configured to control the first battery core and the second battery core to rest for a preset time after the judgment module 801 judges that a maximum first charging voltage is less than the third preset value; and the discharge module 802, further configured to discharge the first battery core and the second battery core until a SOC of each battery cell in the first battery core and the second battery core enters a same state after resting for the preset time.

In some optional embodiment, the discharge module 802 is specifically configured to determine at least one target battery cell according to the first charging voltage of each battery cell in the first battery core; and to discharge at least one target battery cell until the second battery core enters its corresponding fully-charged interval.

In some optional embodiment, the discharge module 802 is further configured to obtain a SOC value of each battery cell in the first battery core after resting the preset time; and discharge each battery cell other than the battery cell corresponding to a minimum SOC value in the first battery core, so that the SOC value of each battery cell in the first battery core is equal to the minimum SOC value; and determine a discharge capacity according to the minimum SOC value; and discharge each battery cell in the second battery core according to the discharge capacity.

The equalizing apparatus of the above battery module can adopt different equalization strategies according to the difference between the two different kinds of battery cores in the battery module entering the full charging interval, and improve equalizing accuracy of the two different kinds of battery cores in the battery module in order to avoid the occurrence of overcharge/overdischarge, and further to improve the life of the battery module. Where the implementation of each module in the equalizing apparatus of the battery module can refer to the implementation of the corresponding steps in the method for equalizing the battery module.

Figure 9:
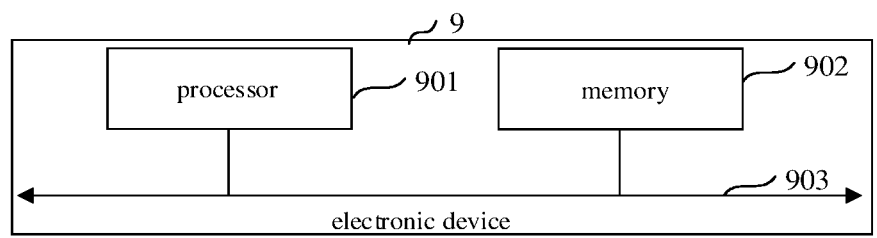
FIG. 9 is a schematic structural diagram of a chip provided by an embodiment of the application.

As shown in FIG. 9, the present application provides a power management controller. The power management controller has a chip 9, and an instruction is solidified in the chip 9. The instruction is executed by the chip to execute the equalizing method according to any one of optional implementation manners of the first aspect and any one of an optional implementation manner of the first aspect. The chip 9 specifically includes: a processor 901 and a memory 902. The processor 901 and the memory 902 are interconnected through a communication bus 903 and/or other forms of connection mechanism (not shown) and communicate with each other. The memory 902 stores a computer program executable by the processor 901. When the computing apparatus is running, the processor 901 executes the computer program to execute the method process in any one of the foregoing implementation manners during execution, such as step S400 to step S406: obtaining a first charging voltage of each battery cell in the first battery core and a second charging voltage of each battery cell in the second battery core; judging whether the first battery core enters its corresponding first fully-charged interval and judging whether the second battery core enters its corresponding second fully-charged interval; if the first battery core enters its corresponding first fully-charged interval and the second battery core doesn't enter its corresponding second fully-charged interval, discharging the second battery core by the power management controller until the first battery core enters its corresponding first fully-charged interval; if the first battery core doesn't enter its corresponding first fully-charged interval and the second battery core enters its corresponding second fully-charged interval, judging whether the maximum value of the first charging voltage of each battery cell in the first battery core is greater than a third preset value; if so, discharging the second battery core until the first battery core enters its corresponding first fully-charged interval; if not, controlling the first battery core and the second battery core to rest for a preset time; after resting for the preset time, discharging the first battery core and the second battery core by the power management controller until a SOC of each battery cell in the first battery core and the second battery core enters a same state.

The present application provides a storage medium with a computer-executable instruction stored therein, the computer-executable instruction executes the steps in any one of an optional implementations the above-mentioned equalizing method, when executed by the processor.

Where the storage medium can be implemented by any type of volatile or non-volatile storage apparatuses or their combination, such as Static Random Access Memory (SRAM), Electrically Erasable Programmable Read-Only Memory(EEPROM), Erasable Programmable Read Only Memory(EPROM), Programmable Read-Only Memory (PROM), Read-Only Memory(ROM), magnetic memory, flash memory, magnetic disk or optical disk.

The present application provides a computer program product, the computer program product, when executed by a computer, causes the computer to execute the method process in any of the foregoing implementation manners.

Although the present application has been described with reference to the preferred embodiments, various modifications can be made to it without departing from the scope of the present application and the components therein can be replaced with equivalents. In particular, as long as there is no structural conflict, the various technical features mentioned in the various embodiments can be combined in any manner. This application is not limited to the specific embodiments disclosed in the text, but includes all technical solutions falling within the scope of the claims.

What is claimed is:

1. A method for equalizing a battery module, the battery module comprising a first battery core, a second battery core, and a power management controller, the first battery core and the second battery core being connected in series, both the first battery core and the second battery core comprising at least one battery cell, the first battery core comprising a first battery chemical component and exhibiting a first open circuit potential curve, the second battery core comprising a second battery chemical component and exhibiting a second open circuit potential curve, and the first open circuit potential curve being different from the second open circuit potential curve, the method comprising:

Obtaining, by the power management controller, a first charging voltage of each battery cell in the first battery core and a second charging voltage of each battery cell in the second battery core;

judging, by the power management controller, whether a maximum value of the first charging voltage of each battery cell in the first battery core is greater than a first preset value to determine whether the first battery core enters a corresponding first fully-charged interval;

judging, by the power management controller, whether a maximum value of the second charging voltage of each battery cell in the second battery core is greater than a second preset value to determine whether the second battery core enters its corresponding second fully-charged interval;

if the first battery core enters its corresponding first fully-charged interval and the second battery core does not enter its corresponding second fully-charged interval, discharging the first battery core by the power management controller until the second battery core enters its corresponding second fully-charged interval;

if the first battery core does not enter its corresponding first fully-charged interval and the second battery core enters its corresponding second fully-charged interval, judging whether the maximum value of the first charging voltage of each battery cell in the first battery core is greater than a third preset value by the power management controller;

and if so, discharging the second battery core by the power management controller until the first battery core enters its corresponding first fully-charged interval;

if not, controlling the first battery core and the second battery core to rest for a preset time by the power management controller;

after resting for the preset time, discharging the first battery core and the second battery core by the power management controller until a SOC of each battery cell in the first battery core and the second battery core enters a same state.

2. The method according to claim 1, wherein discharging the first battery core by the power management controller until the second battery core enters its corresponding fully-charged interval, comprises:

determining, by the power management controller, at least one target battery cell according to the first charging voltage of each battery cell in the first battery core;

discharging, by the power management controller, the at least one target battery cell until the second battery core enters its corresponding second fully-charged interval.

3. The method according to claim 2, wherein determining at least one target battery cell according to the first charging voltage of each battery cell in the first battery core by the power management controller, comprises:

calculating, by the power management controller, a difference between a fully-charged voltage of the second battery core and a minimum value of the second charging voltage in the second battery core to obtain a voltage difference value;

determining, by the power management controller, a fourth preset value according to a fully-charged voltage of the first battery core and the voltage difference value;

determining, by the power management controller, a battery cell with a first charging voltage in the first battery core is greater than the fourth preset value as a target battery cell to obtain the at least one target battery cell.

4. The method according to claim 2, wherein discharging the at least one target battery cell by the power management controller until the second battery core enters its corresponding second fully-charged interval, comprises:

discharging, by the power management controller, the at least one target battery cell;

judging, by the power management controller, whether a maximum value of the second charging voltage in the second battery cell is greater than the second preset value during discharging of the at least one target battery cell;

if so, stopping discharging the at least one target battery cell by the power management controller.

5. The method according to claim 1, wherein after resting for the preset time, discharging the first battery core and the second battery core by the power management controller until a SOC of each battery cell in the first battery core and the second battery core entering a same state, comprises:

obtaining, by the power management controller, a SOC value of each battery cell in the first battery core after resting the preset time;

discharging, by the power management controller, a battery cell other than a battery cell corresponding to a minimum SOC value in the first battery core, so that the SOC value of each battery cell in the first battery core is equal to the minimum SOC value;

determining, by the power management controller, a discharge capacity according to the minimum SOC value;

discharging, by the power management controller, each battery cell in the second battery core according to the discharge capacity.

6. The method according to claim 5, wherein determining a discharge capacity according to the minimum SOC value by the power management controller, comprises:

obtaining, by the power management controller, a rated capacity of the second battery core;

calculating, by the power management controller, the discharge capacity according to the minimum SOC value and the rated capacity of the second battery core.

7. A battery module, the battery module comprising:

a first battery core and a second battery core, the first battery core and the second battery core being connected in series, both the first battery core and the second battery core comprising at least one battery cell, the first battery core comprising a first battery chemical component and exhibiting a first open circuit potential curve, the second battery core comprising a second battery chemical component and exhibiting a second open circuit potential curve, and the first open circuit potential curve being different from the second open circuit potential curve;

a power management controller configured to execute a method equalization processing on the first battery core and the second battery core, the method equalization comprising:

obtaining, by the power management controller, a first charging voltage of each battery cell in the first battery core and a second charging voltage of each battery cell in the second battery core;

judging, by the power management controller, whether a maximum value of the first charging voltage of each battery cell in the first battery core is greater than a first preset value to determine whether the first battery core enters a corresponding first fully-charged interval;

judging, by the power management controller, whether a maximum value of the second charging voltage of each battery cell in the second battery core is greater than a second preset value to determine whether the second battery core enters its corresponding second fully-charged interval;

if the first battery core enters its corresponding first fully-charged interval and the second battery core does not enter its corresponding second fully-charged interval, discharging the first battery core by the power management controller until the second battery core enters its corresponding second fully-charged interval;

if the first battery core does not enter its corresponding first fully-charged interval and the second battery core enters its corresponding second fully-charged interval, judging whether the maximum value of the first charging voltage of each battery cell in the first battery core is greater than a third preset value by the power management controller;

and if so, discharging the second battery core by the power management controller until the first battery core enters its corresponding first fully-charged interval;

if not, controlling the first battery core and the second battery core to rest for a preset time by the power management controller;

after resting for the preset time, discharging the first battery core and the second battery core by the power management controller until a SOC of each battery cell in the first battery core and the second battery core enters a same state.

8. The battery module according to claim 7, wherein the battery module further comprises:

a plurality of equalization units, each the equalization units being disposed on one battery cell, the power management controller and each equalization units being electrically connected to control the equalization unit to perform equalization processing on the corresponding battery cell.

9. The battery module according to claim 7, wherein discharging the first battery core by the power management controller until the second battery core enters its corresponding fully-charged interval, comprises:

determining, by the power management controller, at least one target battery cell according to the first charging voltage of each battery cell in the first battery core;

discharging, by the power management controller, the at least one target battery cell until the second battery core enters its corresponding second fully-charged interval.

10. The battery module according to claim 9, wherein determining at least one target battery cell according to the first charging voltage of each battery cell in the first battery core by the power management controller, comprises:

calculating, by the power management controller, a difference between a fully-charged voltage of the second battery core and a minimum value of the second charging voltage in the second battery core to obtain a voltage difference value;

determining, by the power management controller, a fourth preset value according to a fully-charged voltage of the first battery core and the voltage difference value;

determining, by the power management controller, a battery cell with a first charging voltage in the first battery core is greater than the fourth preset value as a target battery cell to obtain the at least one target battery cell.

11. The battery module according to claim 9, wherein discharging the at least one target battery cell by the power management controller until the second battery core enters its corresponding second fully-charged interval, comprises:

discharging, by the power management controller, the at least one target battery cell;

judging, by the power management controller, whether a maximum value of the second charging voltage in the second battery cell is greater than the second preset value during discharging of the at least one target battery cell;

if so, stopping discharging the at least one target battery cell by the power management controller.

12. The battery module according to claim 7, wherein after resting for the preset time, discharging the first battery core and the second battery core by the power management controller until a SOC of each battery cell in the first battery core and the second battery core entering a same state, comprises:

obtaining, by the power management controller, a SOC value of each battery cell in the first battery core after resting the preset time;

discharging, by the power management controller, a battery cell other than a battery cell corresponding to a minimum SOC value in the first battery core, so that the SOC value of each battery cell in the first battery core is equal to the minimum SOC value;

determining, by the power management controller, a discharge capacity according to the minimum SOC value;

discharging, by the power management controller, each battery cell in the second battery core according to the discharge capacity.

13. The battery module according to claim 12, wherein determining a discharge capacity according to the minimum SOC value by the power management controller, comprises:

obtaining, by the power management controller, a rated capacity of the second battery core;

calculating, by the power management controller, the discharge capacity according to the minimum SOC value and the rated capacity of the second battery core.

14. A power management controller, the power management controller comprising a chip, an instruction is solidified in the chip, the instruction, when executed by the chip, executes the method equalization, a method equalization comprising:

obtaining, by the power management controller, a first charging voltage of each battery cell in the first battery core and a second charging voltage of each battery cell in the second battery core;

judging, by the power management controller, whether a maximum value of the first charging voltage of each battery cell in the first battery core is greater than a first preset value to determine whether the first battery core enters a corresponding first fully-charged interval;

judging, by the power management controller, whether a maximum value of the second charging voltage of each battery cell in the second battery core is greater than a second preset value to determine whether the second battery core enters its corresponding second fully-charged interval;

if the first battery core enters its corresponding first fully-charged interval and the second battery core does not enter its corresponding second fully-charged interval, discharging the first battery core by the power management controller until the second battery core enters its corresponding second fully-charged interval;

if the first battery core does not enter its corresponding first fully-charged interval and the second battery core enters its corresponding second fully-charged interval, judging whether the maximum value of the first charging voltage of each battery cell in the first battery core is greater than a third preset value by the power management controller;

and if so, discharging the second battery core by the power management controller until the first battery core enters its corresponding first fully-charged interval;

if not, controlling the first battery core and the second battery core to rest for a preset time by the power management controller;

after resting for the preset time, discharging the first battery core and the second battery core by the power management controller until a SOC of each battery cell in the first battery core and the second battery core enters a same state.

15. The power management controller according to claim 14, wherein discharging the first battery core by the power management controller until the second battery core enters its corresponding fully-charged interval, comprises:
   determining, by the power management controller, at least one target battery cell according to the first charging voltage of each battery cell in the first battery core;
   discharging, by the power management controller, the at least one target battery cell until the second battery core enters its corresponding second fully-charged interval.

16. The power management controller according to claim 15, wherein determining at least one target battery cell according to the first charging voltage of each battery cell in the first battery core by the power management controller, comprises:
   calculating, by the power management controller, a difference between a fully-charged voltage of the second battery core and a minimum value of the second charging voltage in the second battery core to obtain a voltage difference value;
   determining, by the power management controller, a fourth preset value according to a fully-charged voltage of the first battery core and the voltage difference value;
   determining, by the power management controller, a battery cell with a first charging voltage in the first battery core is greater than the fourth preset value as a target battery cell to obtain the at least one target battery cell.

17. The power management controller according to claim 15, wherein discharging the at least one target battery cell by the power management controller until the second battery core enters its corresponding second fully-charged interval, comprises:
   discharging, by the power management controller, the at least one target battery cell;
   judging, by the power management controller, whether a maximum value of the second charging voltage in the second battery cell is greater than the second preset value during discharging of the at least one target battery cell;
   if so, stopping discharging the at least one target battery cell by the power management controller.

18. The power management controller according to claim 14, wherein after resting for the preset time, discharging the first battery core and the second battery core by the power management controller until a SOC of each battery cell in the first battery core and the second battery core entering a same state, comprises:
   obtaining, by the power management controller, a SOC value of each battery cell in the first battery core after resting the preset time;
   discharging, by the power management controller, a battery cell other than a battery cell corresponding to a minimum SOC value in the first battery core, so that the SOC value of each battery cell in the first battery core is equal to the minimum SOC value;
   determining, by the power management controller, a discharge capacity according to the minimum SOC value;
   discharging, by the power management controller, each battery cell in the second battery core according to the discharge capacity.

19. The power management controller according to claim 18, wherein determining a discharge capacity according to the minimum SOC value by the power management controller, comprises:
   obtaining, by the power management controller, a rated capacity of the second battery core;
   calculating, by the power management controller, the discharge capacity according to the minimum SOC value and the rated capacity of the second battery core.

20. The power management controller according to claim 14, wherein the battery module further comprises:
   a plurality of equalization units, each the equalization units being disposed on one battery cell, the power management controller and each equalization units being electrically connected to control the equalization unit to perform equalization processing on the corresponding battery cell.

* * * * *